(12) United States Patent
Matsuo

(10) Patent No.: US 6,925,548 B2
(45) Date of Patent: Aug. 2, 2005

(54) DATA PROCESSOR ASSIGNING THE SAME OPERATION CODE TO MULTIPLE OPERATIONS

(75) Inventor: Masahito Matsuo, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 559 days.

(21) Appl. No.: 09/971,607

(22) Filed: Oct. 9, 2001

(65) Prior Publication Data

US 2002/0120830 A1 Aug. 29, 2002

(30) Foreign Application Priority Data

Feb. 23, 2001 (JP) ........................................ 2001-049286

(51) Int. Cl.[7] .......................... G06F 15/00; G06F 15/76
(52) U.S. Cl. .............................. 712/24; 712/20; 712/21; 712/22; 712/209
(58) Field of Search .............................. 712/21, 22, 20, 712/209, 24

(56) References Cited

U.S. PATENT DOCUMENTS

| 5,761,470 A | 6/1998 | Yoshida |
| 5,901,301 A | 5/1999 | Matsuo et al. |
| 6,151,668 A * | 11/2000 | Pechanek et al. .............. 712/24 |
| 6,321,322 B1 * | 11/2001 | Pechanek et al. .............. 712/24 |
| 6,453,407 B1 * | 9/2002 | Lavi et al. ..................... 712/24 |
| 6,557,094 B2 * | 4/2003 | Pechanek et al. ........... 712/209 |
| 6,615,339 B1 * | 9/2003 | Ito et al. ........................ 712/24 |

OTHER PUBLICATIONS

"Intel® IA–64 Architecture Software Developer's Manual", Chapter 3, pp. 15–17, vol. 1:IA–64, Application Architecture, Jan. 2000.

* cited by examiner

Primary Examiner—Eddie Chan
Assistant Examiner—Aimee Li
(74) Attorney, Agent, or Firm—Burns, Doane, Swecker & Mathis, L.L.P.

(57) ABSTRACT

A data processor can assign a greater number of operations to instruction codes with shorter length, thereby implementing high performance, high code efficiency and low cost data processor. The data processor is a VLIW (Very Long Instruction Word) system that can execute a plurality of operations in parallel, and specify the execution sequence of the operations. It can assign a plurality of operations to the same operation code, and the operations that are executed in a second or subsequent sequence are limited to only predetermined operations among the plurality of operations.

4 Claims, 15 Drawing Sheets

FIG.1

| BIT NUMBER | 0 | 15 | |
|---|---|---|---|
| R0 | | | ~1 |
| R1 | | | ~2 |
| R2 | | | ~3 |
| R3 | | | ~4 |
| R4 | | | ~5 |
| R5 | | | ~6 |
| R6 | | | ~7 |
| R7 | | | ~8 |
| R8 | | | ~9 |
| R9 | | | ~10 |
| R10 | | | ~11 |
| R11 | | | ~12 |
| R12 | | | ~13 |
| R13 | | LINK | ~14 |
| R14 | | | ~15 |
| R15 | | SPI | ~16 |
| | | SPU | ~17 |
| CR0 | | PSW | ~18 |
| CR2 | | PC | ~19 |

| BIT NUMBER | 0 | 39 | |
|---|---|---|---|
| A0 | | | ~21 |
| A1 | | | ~22 |

FIG.2
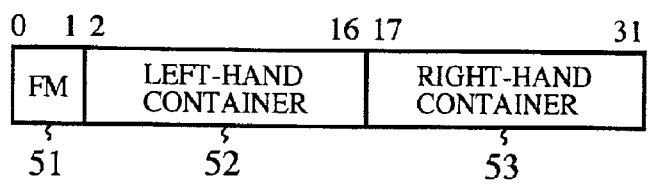
FIG.3
| FM | FORMAT | INSTRUCTION EXECUTION SEQUENCE | LEFT-HAND CONTAINER | RIGHT-HAND CONTAINER |
|---|---|---|---|---|
| 00 | SHORT×2 | PARALLEL | FIRST | FIRST |
| 01 | SHORT×2 | SEQUENTIAL | FIRST | SECOND |
| 10 | SHORT×2 | SEQUENTIAL | SECOND | FIRST |
| 11 | LONG×1 | — | FIRST | |
FIG.4
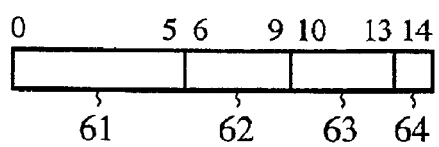

FIG.13

```
           0          5 6    9 10   13
LD   Ra,@Rb+  | 110000  | Ra  | Rb  | 0 |
MAC2 Ra,Rb       201     202   203  204
```

FIG.14

```
            0          5 6    9 10   13
LDB2 Ra,@Rb+  | 010000  | Ra  | Rb  | 0 |
                 205                  206

0          5 6    9 10   13
MAC Ad,Ra,Rb  | 010000  | Ra  | Rb  | Ad|
                 207                  208
```

FIG.15

```
           0          5 6    9 10   13
ADD Ra,Rb  | 000001  | Ra  | Rb  | 0 |
```

FIG.16

```
        0          5 6    9 10   13
NOP  | 111111  | 0000  | 0000  | 1 |
```

FIG.17
Ia
LD R0,@R8+ | | ADD R4,R5
Ib
FIG.18
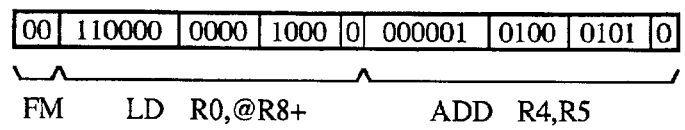
FIG.19
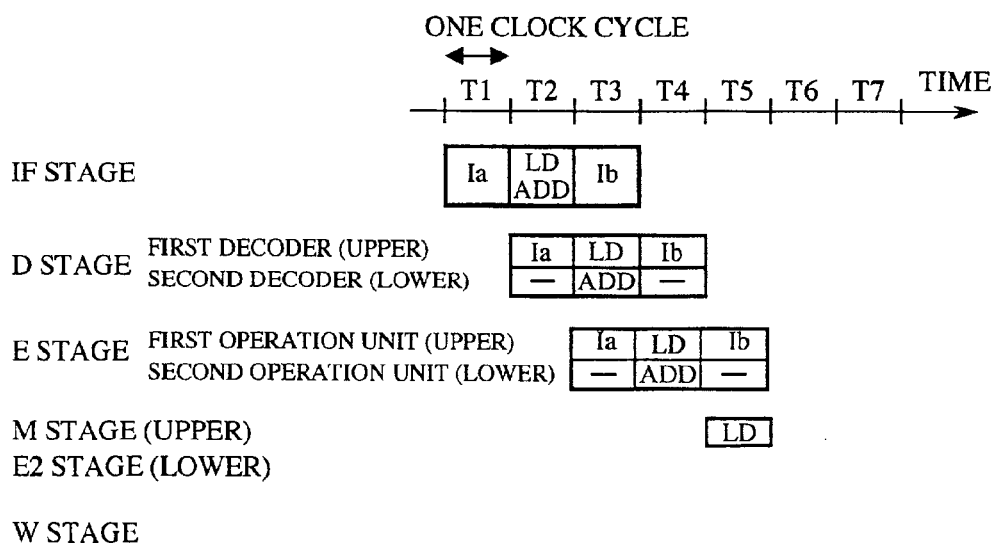

FIG.20
Ia
LD   R0,@R8+
ADD  R4,R0
Ib
FIG.21
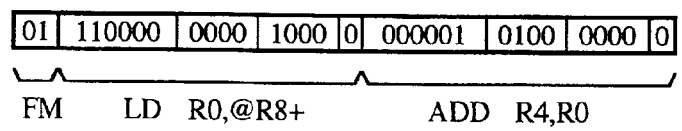
FM   LD R0,@R8+   ADD R4,R0
FIG.22
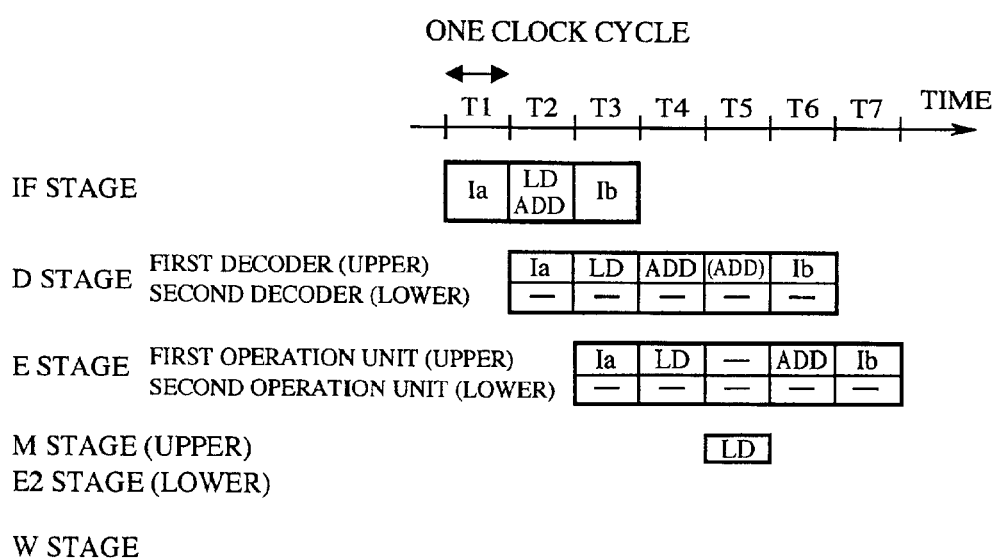

FIG.23
Ia
ADD R4,R5
LD R0,@R4+
Ib
FIG.24
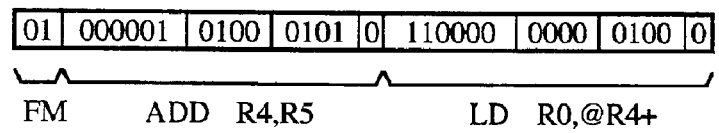
FIG.25
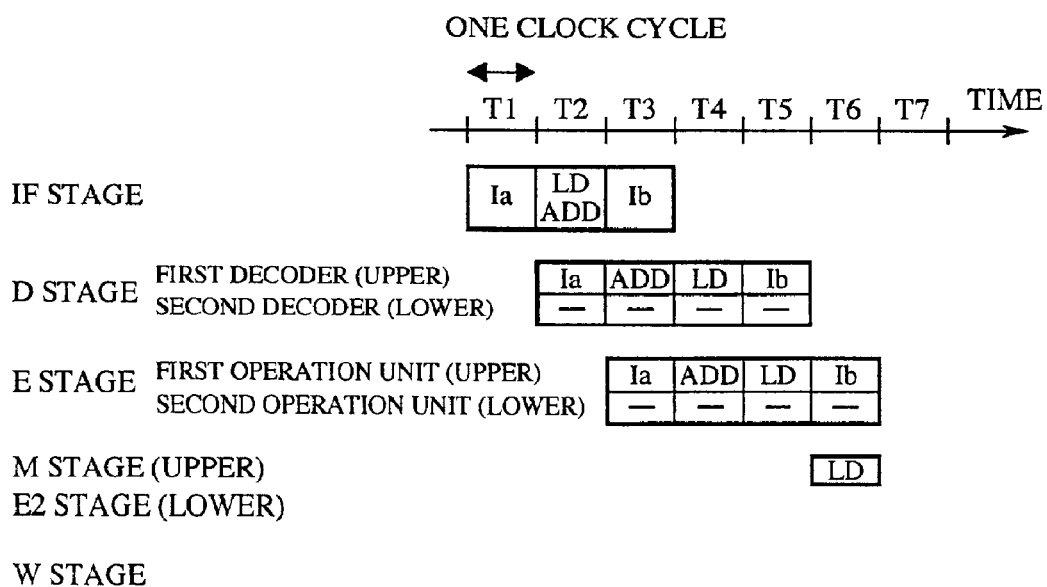

FIG.28
Ia
ADD R4,R5 || MAC2 R0,R8
Ib
FIG.29
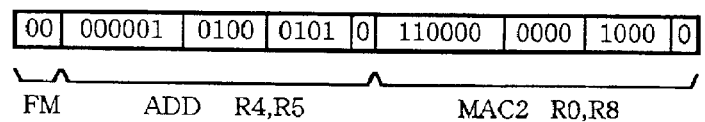
FIG.30
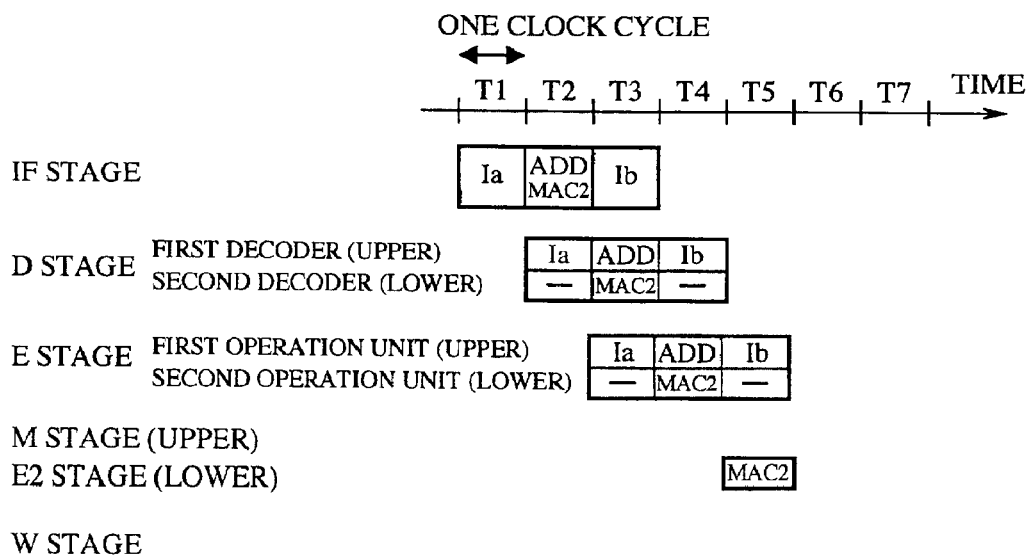

FIG.31
Ia
MAC2  R0,R8
ADD    R4,R5
Ib
FIG.32
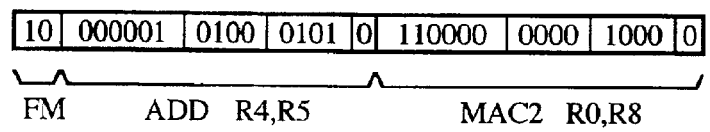
FIG.33
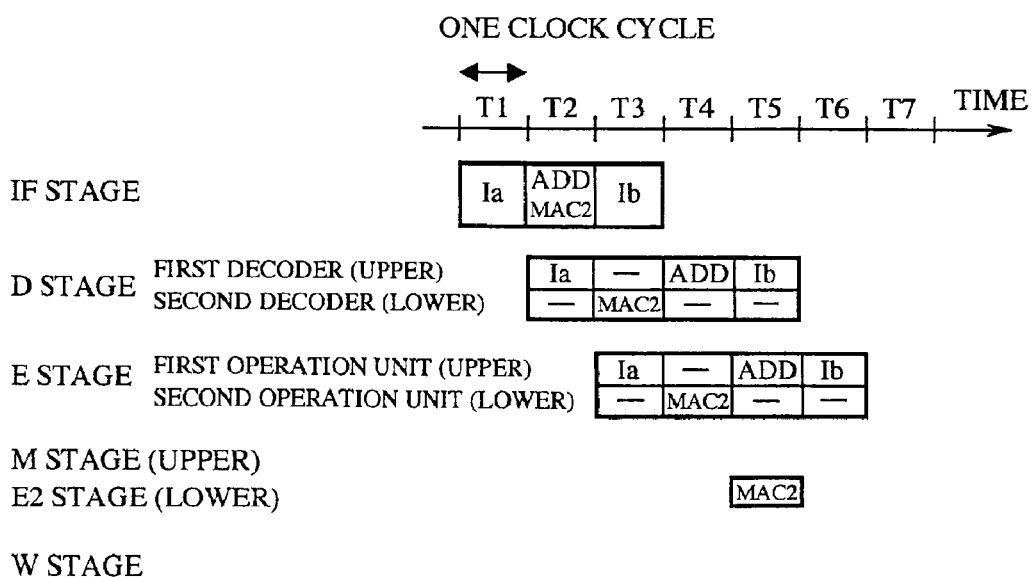

FIG. 34
Ia
ADD   R4,R5
MAC2  R0,R4
Ib
FIG. 35
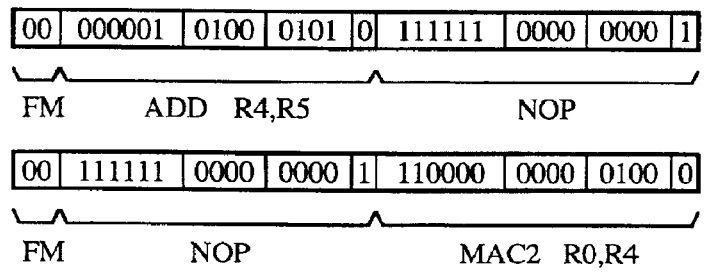
FIG. 36
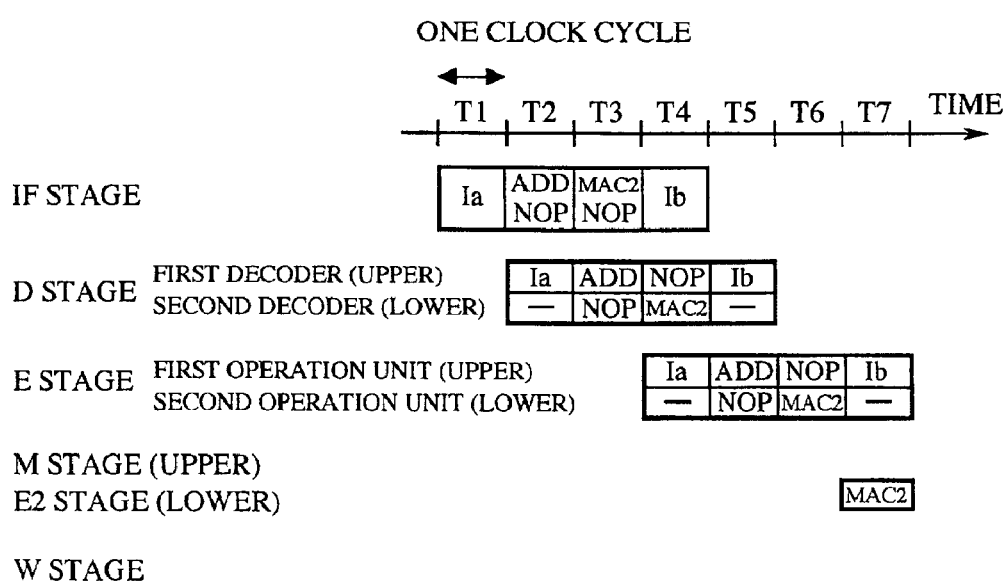

DATA PROCESSOR ASSIGNING THE SAME OPERATION CODE TO MULTIPLE OPERATIONS

BACKGROUND OF THE INVENTION

1. Field of the Invention

The present invention relates to a data processor for executing a plurality of operations in parallel.

2. Description of Related Art

Recently, high performance processors utilizing a VLIW (Very Long instruction Word) technique and multimedia-oriented processors for processing digital signals effectively have been developed.

Although the VLIW technique enables parallel operations using hardware control simpler than the superscaler technique, it has a problem of increasing its code size generally. For example, when it executes an instruction that includes a plurality of operation codes and a field having no operation to be executed, it embeds into the field an operation code indicating no operation (NOP). Thus, the NOP code will increase the code size if no other steps are taken.

For example, U.S. Pat. No. 5,761,470 discloses a technique for reducing the code size by preparing a field for specifying a format (long format or short format) and an execution sequence of instructions. However, since the instructions must be executed sequentially according to the execution sequence specification, even if execution units are asymmetric and different execution units are used to perform the operations, the value of the operation code must have one-to-one correspondence with the content of the operation. If a field is prepared for specifying the execution units to execute the operations, it will be possible to assign different operations to the same operation code. In this case, however, the field for specifying the execution units will increase the code size.

Furthermore, reducing the number of instructions too much to shorten the basic instruction length presents another problem of making it difficult to achieve desired functions and performance. In addition, it presents another problem of increasing the code size oppositely because the number of instructions increases to achieve a given processing.

In summary, the conventional data processor with the foregoing configuration has the following problems: when the number of executable instructions is increased to enhance the performance, the code size increases; and when the number of instructions is reduced too much to shorten the basic instruction length, the desired functions and performance cannot be achieved.

SUMMARY OF THE INVENTION

The present invention is implemented to solve the foregoing problems. It is therefore an object of the present invention to provide an inexpensive data processor with high performance and high code efficiency by assigning the same operation code to a plurality of operations without preparing any field for specifying the execution units, thereby assigning a greater number of instructions to instruction codes with a shorter code length.

According to one aspect of the present invention, there is provided a data processor for processing an instruction that includes a first operation code field, a second operation code field, and an execution sequence specifying field for specifying an execution sequence of a plurality of operations specified by a plurality of operation code fields including the first operation code field and the second operation code field, the data processor comprising: instruction decoding means for decoding instructions; and instruction executing means for executing the instructions according to a decoded result by the instruction decoding means, wherein the instruction decoding means includes: first decoding means for decoding the first operation code field when an operation specified by the first operation code field is executed in a first execution sequence in accordance with a content specified by the execution sequence specifying field; second decoding means for decoding the second operation code field when an operation specified by the second operation code field is executed in the first execution sequence in accordance with the content specified by the execution sequence specifying field; and decision means for making a decision as to which one of decoding means including the first decoding means and the second decoding means is to be used for decoding the operation code field to be executed in a second or subsequent sequence in accordance with the content specified by the execution sequence specifying field, and wherein the instruction executing means comprises: means for executing a first operation in response to the decoded result by the first decoding means when the first operation code field has a first bit pattern, and when the operation specified by the first operation code field is executed in the first sequence according to the execution sequence specifying field; and means for executing a second operation different from the first operation in response to the decoded result by the second decoding means when the second operation code field has the first bit pattern, and when the operation specified by the second operation code field is executed in the first sequence according to the execution sequence specifying field.

Here, the instruction executing means may further comprise: means for executing the second operation in response to the decoded result by the second decoding means when the first operation code field has the first bit pattern, when the execution sequence specifying field specifies that the operation specified by the first operation code field is to be executed in the second or subsequent sequence, and when the decision means makes a decision that the second decoding means is used for decoding the first operation code field.

The decision means may make a decision in response to a decoded result by a decoder other than the first decoding means and the second decoding means.

The decision means may makes a decision in response to decoded results by decoders including the first decoding means and the second decoding means.

BRIEF DESCRIPTION OF THE DRAWINGS

FIG. 1 is a schematic diagram showing a register set of an embodiment 1 of the data processor in accordance with the present invention;

FIG. 2 is a schematic diagram showing an instruction format of the data processor;

FIG. 3 is a table showing details of the format and execution sequence specification of the FM bits of FIG. 2;

FIG. 4 is a schematic diagram showing a bit assignment of a short instruction with two operands;

FIG. 13 is a schematic diagram showing an instruction bit assignment of an LD instruction of a register indirect mode with post-increment and of a MAC2 instruction;

FIG. 14 is a schematic diagram showing instruction bit assignments of an LDB2 instruction of the register indirect mode with post-increment and of a MAC instruction;

FIG. 15 is a schematic diagram showing an instruction bit assignment of an ADD instruction;

FIG. 16 is a schematic diagram showing a bit assignment of a NOP instruction;

FIG. 17 is a diagram illustrating an example of a program executing the LD instruction and ADD instruction in parallel;

FIG. 18 is a schematic diagram showing encoding behavior of the LD instruction and ADD instruction as a 32-bit instruction;

FIG. 19 is a schematic diagram showing a pipeline processing of the program;

FIG. 20 is a diagram illustrating an example of a program executing the ADD instruction after the execution of the LD instruction;

FIG. 21 is a schematic diagram showing encoding behavior of the LD instruction and ADD instruction as a 32-bit instruction;

FIG. 22 is a schematic diagram showing a pipeline processing of the program;

FIG. 23 is a diagram illustrating an example of a program executing the LD instruction after the execution of the ADD instruction;

FIG. 24 is a schematic diagram showing encoding behavior of the LD instruction and ADD instruction as a 32-bit instruction;

FIG. 25 is a schematic diagram showing behavior of a pipeline processing when the encoding is executed as shown in FIG. 24;

FIG. 28 is a diagram illustrating an example of a program executing the ADD instruction and MAC2 instruction in parallel;

FIG. 29 is a schematic diagram showing encoding behavior of the ADD instruction and MAC2 instruction as a 32-bit instruction;

FIG. 30 is a schematic diagram showing behavior of a pipeline processing of the program;

FIG. 31 is a diagram illustrating an example of a program executing the ADD instruction after the execution of the MAC2 instruction;

FIG. 32 is a schematic diagram showing encoding behavior of the ADD instruction and MAC2 instruction as a 32-bit instruction;

FIG. 33 is a schematic diagram showing behavior of a pipeline processing of the program;

FIG. 34 is a diagram illustrating an example of a program executing the MAC2 instruction after the execution of the ADD instruction;

FIG. 35 is a schematic diagram showing encoding behavior of the ADD instruction and MAC2 instruction as a 32-bit instruction;

FIG. 36 is a schematic diagram showing a pipeline processing when the encoding is executed by the program.

DETAILED DESCRIPTION OF THE PREFERRED EMBODIMENTS

Figure 5:
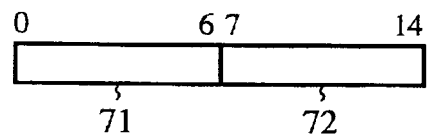
FIG. 5 is a schematic diagram showing an assignment of a branch instruction with a short format.

The invention will now be described with reference to the accompanying drawings.

Embodiment 1

The data processor is a 16-bit processor whose bit length of the address and data is 16 bits.

FIG. 1 shows a register set of the data processor. The data processor employs Big-endian for the bit order and byte order so that the MSB (Most Significant Bit) occupies bit-0 in the bit arrangement.

Sixteen general-purpose registers R0–R15 each store data or address value. Reference numerals 1–15 designate the general-purpose registers R0–R14, in which the register R13 14 is assigned as a link (LINK) register for storing a return address at a subroutine jump. A reference symbol R15 designates a stack pointer (SP), in which an interrupt stack pointer (SPI) 16 and a user stack pointer (SPU) 17 are switched by a stack-mode bit (not shown) of a processor status word (PSW) 18. The SPI 16 and the SPU 17 are generically called a stack pointer (SP) from now on. Usually, a 4-bit register specifying field specifies the number of a register to be used as an operand.

The data processor comprises control registers such as the processor status word (PSW) 18 or a program counter (PC) 19. Like the general-purpose registers, the control registers are usually specified by four bits. Since the control registers have no direct relation with the present invention, the description thereof is omitted here.

Reference numerals 21 and 22 designate 40-bit accumulators A0 and A1.

The data processor handles 2-way VLIW (Very Long Instruction Word) instruction set. FIG. 2 shows an instruction format of the data processor. The basic instruction length is fixed at 32 bits, and the instructions are each aligned at a 32-bit boundary. The PC value is managed by 32-bit instruction word address.

Each 32-bit instruction code consists of a 2-bit format specificationbits (FM bits) 51 indicating an instruction format, a 15-bit left-hand container 52 and a 15-bit right-hand container 53. The containers 52 and 53 can each store a sub-instruction with a 15-bit short format, or they can store a single 30-bit long format sub-instruction. For the sake of simplicity, the short format sub-instruction is referred to as a short instruction, and the long format sub-instruction is called a long instruction from now on.

The FM bits 51 specify the instruction format and the execution sequence of the two short instructions. FIG. 3 shows the detail of the format of the FM bits 51 and the execution sequence specification. In the instruction execution sequence, the term "first" indicates that it is a first instruction to be executed, and the term "second" indicates a second instruction to be executed. The FM bits 51 of "11" indicates that the 30 bits of the containers 52 and 53 hold a single long instruction. The remaining values indicate that the containers 52 and 53 each hold a short instruction. In addition, when they hold the two short instructions, the FM bits 51 specify the execution sequence: The value "00" indicates that the two short instructions are to be carried out in parallel; the value "01" indicates that the short instruction held in the left-hand container 52 is executed first, followed by the short instruction held in the right-hand container 53; and the "10" indicates that the short instruction held in the right-hand container 53 is executed first, followed by the short instruction held in the left-hand container 52. Thus, the coding efficiency is improved by making it possible to encode them into a single 32-bit instruction including two short instructions to be executed sequentially.

Figure 6:
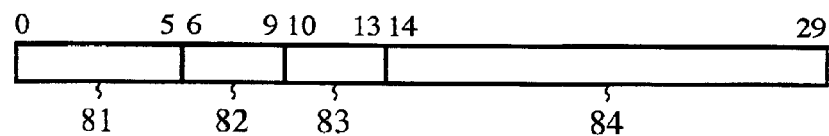
FIG. 6 is a schematic diagram showing a format of a 3-operand instruction or load/store instruction with a 16-bit displacement or immediate value.
Figure 7:
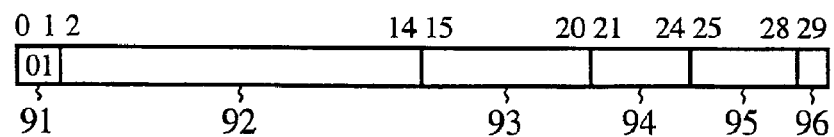
FIG. 7 is a schematic diagram showing a format of a long format instruction with an operation code on the right-hand container side.

FIGS. 4–7 each illustrate a bit assignment of a typical instruction. FIG. 4 illustrates the bit assignment of a short instruction with two operands. In FIG. 4, fields 61 and 64 are operation code fields. The field 64 can specify an accumulator number in some cases. The remaining fields 62 and 63 specify the positions of data referred to or updated as an operand in terms of a register number or an accumulator number. The field 63 can specify a 4-bit short immediate value in some cases. FIG. 5 illustrates an assignment of a short format branch instruction consisting of an operation code field 71 and an 8-bit branch displacement field 72. The branch displacement is specified in terms of the offset of the instruction word (32 bits) just as the PC value. FIG. 6 illustrates a format of a 3-operand instruction with a 16-bit displacement or an immediate value, or a format of the load/store instruction, consisting of an operation code field 81, fields 82 and 83 for specifying a register number or the like as in the short format, and an extended data field 84 for specifying the 16-bit displacement or immediate value. FIG. 7 illustrates the format of a long instruction having an operation code in the right-hand container 53 and the 2-bit field 91 of "01". Fields 93 and 96 are an operation code field; and fields 94 and 95 are a field for specifying a register number or the like. A field 92 can further designate the operation code or register number.

In addition to the foregoing instructions, there are instructions such as a NOP (no operation) instruction with its all 15 bits being an operation code, and instructions with a special bit assignment as a single operand instruction.

The sub-instructions of the data processor form a RISC (reduced instruction set computer)-like instruction set. The load/store instruction is an only one instruction that accesses memory data, and an operation instruction performs an arithmetic operation on the operand in a register/accumulator or on an immediate value operand. There are five addressing modes of the operand data: a register indirect mode; a register indirect mode with post-increment; a register indirect mode with post-decrement; a push mode; and a register-relative indirect mode. Their mnemonics are "@Rsrc", "@Rsrc+", "@Rsrc–", "@–SP" and "@(disp16, Rsrc)". The "Rsrc" designates a register number for specifying a base address, and the "disp16" designates the 16-bit displacement value. The address of the operand is specified by a byte address.

The load/store instructions other than in the register-relative indirect mode have an instruction format as illustrated in FIG. 4. The field 63 specifies a base register number, and the field 62 designates the number of a register to which the value loaded from the memory is written, or the number of a register that holds the value to be stored. In the register indirect mode, the value of the register specified as the base register serves as the operand address. In the register indirect mode with post-decrement, the value of the register specified as the base register serves as the operand address, and the value in the base register is post-incremented by the size (the number of bytes) of the operand and written back. In the register indirect mode with post-decrement, the value of the register specified as the base register serves as the operand address, and the value in the base register is post-decremented by the size (the number of bytes) of the operand and written back. The push mode is usable only when the store instruction is provided and the base register is the register R15. In the push mode, the stack pointer (SP) value pre-decremented by the size (the number of bytes) of the operand serves as the operand address, and the decremented value is written back to the SP.

The load/store instruction in the register-relative indirect mode has the instruction format as illustrated in FIG. 6. The field 83 specifies a base register number, and the field 82 designates the number of a register to which the value loaded from the memory is written, or the number of a register that holds the value to be stored. The field 84 specifies the displacement value of the operand-stored position from the base address. In the register-relative indirect mode, the operand address is obtained by adding the 16-bit displacement value to the value of the register specified as the base register.

Jump addressing of a jump instruction includes register indirect addressing for specifying the jump address by using a register value, and PC relative indirect addressing for specifying the jump address by using a branch displacement of the jump instruction from the PC. The PC relative indirect addressing includes short format addressing for specifying the branch displacement by using eight bits, and long format addressing for specifying the branch displacement by using 16 bits.

Figure 8:
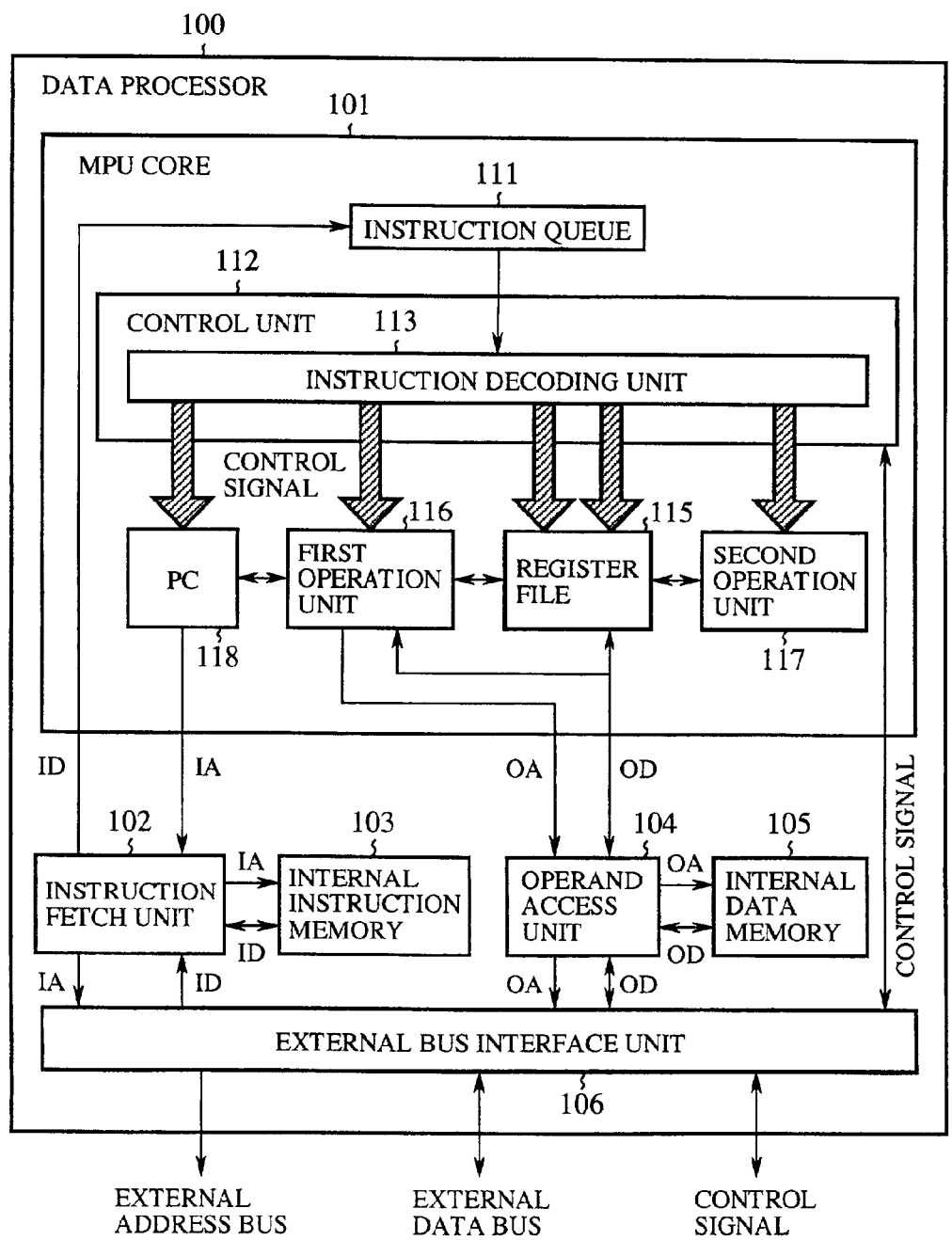
FIG. 8 is a block diagram showing a configuration of the data processor.

FIG. 8 is a block diagram showing a configuration of the present data processor 100. The data processor 100 comprises an MPU core 101; an instruction fetch unit 102 for accessing instruction data in response to a request from the MPU core 101; an internal instruction memory 103; an operand access unit 104 for accessing operand data in response to a request from the MPU core 101; an internal data memory 105; and an external bus interface unit 106 for arbitrating between requests from the instruction fetch unit 102 and from the operand access unit 104, and for accessing the external memory of the data processor 100. In FIG. 8, the reference symbol IA designates an instruction address; ID designates instruction data (instruction code); OA designates an operand address; and OD designates operand data.

The MPU core 101 comprises an instruction queue 111, a control unit 112, a register file 115, a first operation unit 116, a second operation unit 117, and a PC (Program Counter) unit 118.

The instruction queue 111, which comprises a two-entry 32-bit instruction buffer, a valid bit and an input/output pointer, is controlled in the FIFO (First-In First-Out) order. It temporarily holds the instruction data fetched by the instruction fetch unit 102, and transfers the instruction data to the control unit 112.

The control unit 112 carries out all the control of the MPU core 101 such as the control of the instruction queue 111, the pipeline control, the instruction execution, the interface control with the instruction fetch unit 102 and the operand access unit 104. The control unit 112 comprises an instruction decoding unit 113 for decoding the instruction code transferred from the instruction queue 111.

Figure 9:
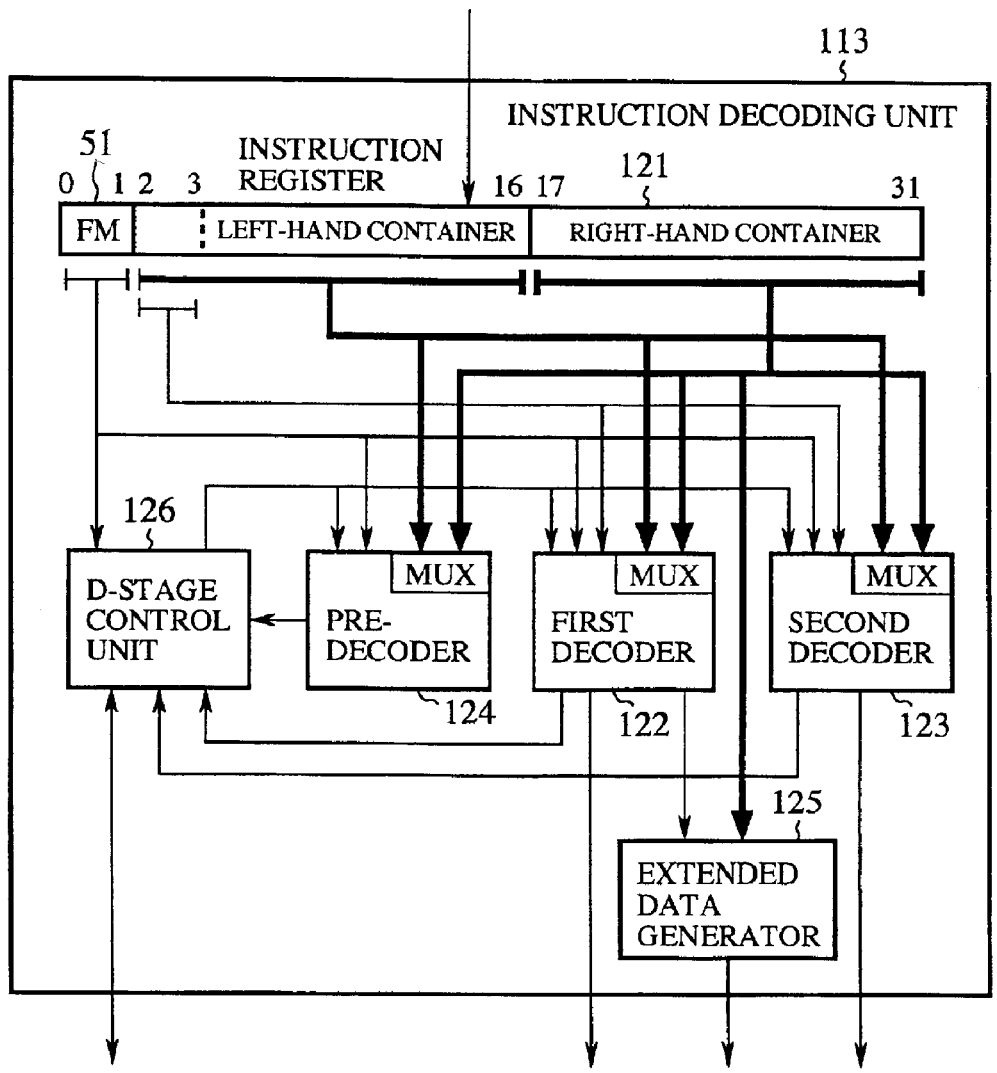
FIG. 9 is a block diagram showing a configuration of an instruction decoding unit.

FIG. 9 is a block diagram showing a configuration of the instruction decoding unit 113, in which only portions relevant to the present embodiment are drawn, and the other portions are omitted. In FIG. 9, the reference symbol MUX designates a multiplexer. The instruction register 121 holds the instruction to be decoded. The instruction decoding unit 113 comprises two decoders for generating an execution control signal and the like so that it can decode two short format instructions in parallel. The first decoder 122 decodes an instruction executed by the first operation unit 116, and chiefly generates instruction execution control signals of the first operation unit 116, PC 118 and register file 115, and control signals and the like associated with the branch/jump/operand access. The second decoder 123 decodes instructions executed by the second operation unit 117, and chiefly generates instruction execution control signals of the second operation unit 117 and register file 115. A predecoder 124 decodes, when two short instructions are executed sequentially, the instruction to be executed secondly while the firstly executed instruction is being decoded, and makes a decision as to which one of the decoders is to be used to decode the secondly executed instruction after decoding the firstly executed instruction. An extended data generator 125 extracts extended data such as an immediate value or a displacement needed for executing an instruction by the first operation unit 116. To extract the extended data of a long format instruction, the data in the right-hand container 53 is also transferred. The immediate value needed for the execution in the second operation unit 117 is assumed to be generated in the second decoder 123. A D-stage control unit 126 performs the state control of the instruction decoding in an instruction decoding stage (D-stage). The pipeline processing will be described later. (It is not necessary for the D-stage control unit 126 to be included in the instruction decoding unit 113. However, since the analysis of the instruction involves the D-stage control unit 126, the description is made under the assumption that it is included in the instruction decoding unit 113 in the present embodiment)

In the first cycle of decoding the 32-bit instruction, the first decoder 122 analyzes the instruction code in the left-hand container 52, and the second decoder 123 analyzes the instruction code in the right-hand container 53, without exception. However, the FM bits 51 and the bits 0 and 1 of the left-hand container are analyzed by the both decoders. Thus, the instruction to be executed first must be placed at the position corresponding to the execution unit that carries out the instruction. When two short instructions are executed sequentially, the firstly executed instruction is decoded first according to the decoded result by the predecoder, and subsequently, the instruction code of the secondly executed instruction is loaded into the selected decoder to be analyzed. When the secondly executed instruction can be decoded by either of the decoders, the first decoder 122 decodes it. The detail of the decoding will be described later.

The register file 115, which corresponds to the general-purpose registers R0–R15 1–17, holds addresses, data and values to be processed. The register file 115 is connected with the first operation unit 116, the second operation unit 117, the PC 118 and the operand access unit 104 through a plurality of buses. When a word/2-word/4-word load instruction is executed, the load data is captured from the operand access unit 104 directly.

The first operation unit 116 mainly executes the load/store instruction, branch instruction, and arithmetic/logic/comparison/transfer instruction.

The first operation unit 116 is connected with the register file 115, the operand access unit 104 and the PC 118 via a plurality of buses, and transfers data and addresses needed for executing the instructions. It captures the extended data necessary for operations such as immediate values or displacement from the extended data generator 125 of the instruction decoding unit 113.

The first operation unit 116 comprises an ALU (Arithmetic-Logic Unit) (not shown), and carries out the transfer, comparison, arithmetic-logic operations, operand address computation/transfer, increment/decrement of operand and address values, jump address computation/transfer, etc. The results of the computation and address update are written back into the registers specified by the instructions in the register file 115.

When executing the load/store instruction, the first operation unit 116 supplies the computed operand address to the operand access unit 104. When executing the jump/branch instruction, it supplies the jump address to the PC 118.

When executing a store instruction, the first operation unit 116 holds and aligns the store data read from the register file 115, and then supplies the data to the operand access unit 104. In a byte loading operation, the first operation unit 116 carries out byte alignment and zero/sign extension of the load data captured from the operand access unit 104, and supplies the data to the register file 115.

The PC 118, which comprises an execution unit such as an incrementor and latches and is synchronized with the pipeline processing of the instructions, executes the management/update of the instruction fetch address and the instruction PC value under the control of the control unit 112. When the process sequence of the instructions is switched including the case immediately after the reset operation, the PC 118 captures the jump address from the first operation unit 116 to perform the initial set of the values of various address latches.

In the instruction fetch, the PC 118 supplies the address of the next instruction to be fetched to the instruction fetch unit 102. When handling the branch instruction, it supplies the first operation unit 116 with the address of the branch instruction needed for computing the branch address. In the subroutine jump/branch instruction, it supplies the register file 115 with the next instruction address of the subroutine jump/branch instruction as the return address via the first operation unit 116.

The second operation unit 117 mainly carries out arithmetic-logic operations including multiply-add operations, and other operations such as shift, bit operations, comparison and transfer. The second operation unit 117, being connected with the register file 115 through a plurality of buses, reads the reference operand data from the register file 115, and supplies write operand data to the register file 115. The second operation unit 117 comprises execution units such as a 40-bit ALU, a 40-bit barrel shifter, 17-bit-by-17-bit multipliers and a priority encoder, and two 40-bit accumulators 21 and 22 as shown in FIG. 1. The second operation unit 117 comprises two multipliers and two adders, and has a function to carry out the two multiply-add operations in parallel.

Figure 10:
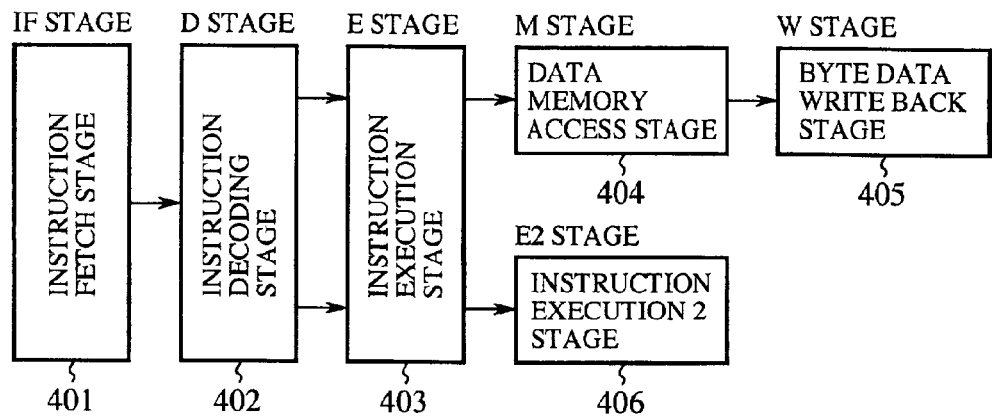
FIG. 10 is a block diagram showing a pipeline processing.

Next, the pipeline processing of the data processor will be described. FIG. 10 is a block diagram illustrating the pipeline processing. The data processor performs 5-stage pipeline processing including an instruction fetch (IF) stage 401 for fetching instruction data, an instruction decode (D) stage 402 for analyzing instructions, an instruction execution (E) stage 403 for executing operations; a memory access (M) stage 404 for accessing a data memory; and a write back (W) stage 405 for writing a byte operand loaded from the memory to a register. The E stage 403 writes operation result in this E stage 403 into the registers, and the M stage 404 completes the writing into the registers at the word (2-byte), 2-word (4-byte) or 4-word (8-byte) load. As for the multiply-add/multiply-subtract operation, the instruction is executed by 2-stage pipeline of additional multiplication and addition. The post-stage processing is called an instruction execution 2 (E2) stage 406. A successive multiply-add/multiply-subtract operation is carried out in a throughput of one operation per one clock cycle.

The IF stage 401 mainly carries out the instruction fetch, and the management of the instruction queue 1. Specifically, the IF stage 401 controls the operation of the instruction fetch unit 102, internal instruction memory 103, external bus interface unit 106, instruction queue 111, the portion of the PC 118 associated with the instruction fetch address management, and the portions of the control unit 112 that carry out the stage control of the IF stage, the instruction fetch control and the control of the PC 118. The IF stage 401 is initialized by a jump at the E stage 403.

When the instruction queue 111 is available, the IF stage 401 sends the instruction fetch request from the control unit 112 to the instruction fetch unit 102. The instruction fetch address value is transferred from the PC 118 to the instruction fetch unit 102, which fetches the instruction data. When the internal instruction memory 103 holds the corresponding instruction data, it reads the instruction code from the internal instruction memory 103. In this case, one clock cycle can complete the fetch of the 32-bit instruction. When the internal instruction memory 103 includes no corresponding instruction data, it supplies the external bus interface unit 106 with an instruction fetch request. The external bus interface unit 106 conducts arbitration between the fetch request and the request from the operand access unit 104, and when it becomes possible to capture the instruction, it fetches the instruction data from the external storage, and sends it to the instruction fetch unit 102. The external bus interface unit 106 can access the external storage in two clock cycles at the minimum. The instruction fetch unit 102 supplies the captured instruction to the instruction queue 111, and the instruction queue 111 supplies the captured instruction code to the instruction decoding unit 113.

In the D-stage 402, the instruction decoding unit 113 analyzes the operation code, and generates a set of control signals for the first operation unit 116, second operation unit 117, PC 118 and the like to execute the instructions. The D-stage 402 is initialized by a jump at the E stage 403. If the instruction code sent from the instruction queue 111 is invalid, the D-stage 402 is placed in an idle cycle to wait for a valid instruction code to be captured. If the E stage 403 is not permitted to start the next processing, the control signals to be sent to the execution units and the like are invalidated, and the D stage 403 waits for the termination of processing of the preceding instruction at the E stage 403. For example, such a condition occurs when the instruction being executed at the E stage 403 is a memory access instruction and the preceding memory access is not terminated at the M stage 404.

Figure 11:
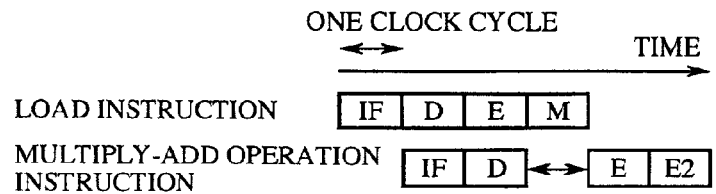
FIG. 11 is a schematic diagram showing an example of a load operand conflict.
Figure 12:
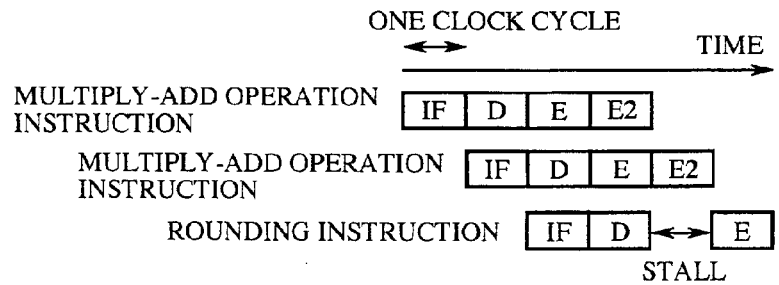
FIG. 12 is a schematic diagram showing an execution hardware conflict.

The D-stage 402 also carries out the division of the two instructions to be executed sequentially, and the sequence control of a two-cycle execution instruction. In addition, it carries out the conflict check of a load operand using a scoreboard register (not shown), the conflict check of the execution unit in the second operation unit 117, and when the conflict is detected it inhibits a new processing until the conflict is eliminated. FIG. 11 shows an example of the load operand conflict. When a multiply-add operation instruction that refers to the operand loaded is present immediately after a word, 2-word or 4-word load instruction, the D stage 402 halts the start of the execution of the multiply-add operation instruction until the load into the register is completed. In this case, even when the memory access terminates in one clock cycle, one clock cycle stall takes place. To load the byte data, since the writing to the register file completes at the W stage, one more cycle stall is required. FIG. 12 illustrates an example of the execution hardware conflict. For example, when a rounding instruction using the adder is present immediately after the multiply-add operation instruction, the start of the execution of the rounding instruction is halted until the previous multiply-add operation instruction is completed. In this case, one clock cycle stall occurs. No stalls will occur if the multiply-add operation instructions are executed successively.

The E stage 403 carries out almost all the processing about the instruction execution except for the memory access and the add and subtract operations of the multiply-add/multiply-subtract such as arithmetic operations, comparison, data transfer between registers including the control registers, operand address calculation of the load/store instruction, jump address calculation of the jump instruction, jump processing, EIT (generic term for exceptions, interrupts and traps) detection, and jump to an EIT vector table.

The E stage 403 enters an idle mode when the D-stage 402 issues no processing.

The completion of the execution at the E stage 403 must stall when the instruction being processed at the E stage 403 is an operand access instruction and a preceding memory access at the M stage 404 has not completed. The stage control is carried out by the control unit 112.

In the E stage 403, the first operation unit 116 performs the arithmetic-logic operations, comparison, transfer, and calculation of the memory operand address or of the branch address. The extended data such as the immediate value and displacement, which are read from the general-purpose registers in the register file 115, from the control registers in the first operation unit 116 and PC 118, and from the instruction decoding unit 113, are read out as the source operand. When the operation instruction is executed, the ALU in the first operation unit 116 executes the operations including transfer. When the destination operand is a general-purpose register or control register, the computation result of the ALU is written into the register file 115, or to the control register in the first operation unit 116 or PC 118. In the case of the load/store instruction, the computation result (address value) is supplied to the operand access unit 104. As for the jump instruction, the jump address is transferred to the PC 118. In the case of the store instruction, the stored data read from the register file 115 is aligned and held.

The E stage 403 updates the PC values that are independent of the instructions executed. The PC 118 manages the PC value of the instruction being executed, and generates the address of the next instruction to be executed. When a jump takes place in the E stage, the first operation unit 116 transfers the jump address to the PC 118 to be initialized. When the instructions are executed sequentially, the PC value is incremented by one by the incrementor (not shown) every time the 32-bit instruction is started.

In the E stage 403, the second operation unit 116 executes all the operations such as arithmetic-logic operations, comparison, transfer, shift, etc., except for the add and subtract operations of the multiply-add operation. The operand value is read from the register file 115, immediate value (decode result not shown) or the accumulator, and is subjected to the specified operation by the execution unit in the second operation unit 117, and the computation result is written into the accumulator or register file 115.

The E stage 403 also carries out the update control of the flag values in the PSW obtained as the computation results by the first operation unit 116 and the second operation unit 117.

The operation control signals generated by the second decoder 123 for executing the addition and subtraction of the multiply-add/multiply-subtract operation are held under the control of the E stage 403. The memory access information and load register information are sent to the M stage 404. The stage control of the E stage 403 is carried out by the control unit 112.

In the M stage 404, according to the operand access request from the control unit 112, the operand access is made using the address sent from the first operation unit 116. When the operand is in the internal data memory 105 or in an on-chip IO (not shown), the operand access unit 104 carries out operand read or write once per clock cycle from or to the internal data memory 105 or on-chip IO. When the operand is not in the internal data memory 105 or on-chip IO, the operand access unit 104 supplies the external bus interface unit 106 with a data access request. The external bus interface unit 106 makes a data access to the external storage, and transfers the data to the operand access unit 104 in the case of the load. The external bus interface unit 106 can make an access to the external storage in two clock cycles at the minimum. In the case of the load, the operand access unit 104 transfers the read data via the bus. In the case of the byte data, the data is written in the execution unit 116, and as for the word, 2-word or 4-word data, the data is directly written in the register file 115. In the case of store, the value of the aligned store data is transferred from the first operation unit 116 to the operand access unit 104, and is written into the target memory. The M stage 404 also generates the address for the second half access of unaligned access, and carries out the access control. The stage control of the M stage 404 is also carried out by the control unit 112.

In the case of the byte data load, the W stage 405 makes the alignment and zero/sign extension of the load operand (byte) held in the first operation unit 116, followed by writing it to the register file 115.

The E2 stage 406 carries out the addition and subtraction of the multiply-add/multiply-subtract operation, and writes the addition and subtraction result back to the accumulator.

The data processor carries out the internal control according to the input clock signal. Each of the pipeline stages requires a minimum of one internal clock cycle to terminate its processing. Since the details of the clock control are not directly related to the present invention, the description thereof is omitted here.

Next, examples of the sub-instructions will be described. The operation instruction such as add and subtract operations, logic operations and comparison and the register-to-register transfer instruction are completed in the three stages, the IF stage 401, D-stage 402 and E stage 403. The operations and data transfer are performed by the E stage 403.

The multiply-add/multiply-subtract instruction is executed in the 2-clock cycles for the E stage 403 for carrying out multiplication and the E2 stage for carrying out add and subtract operations, and hence its processing consists of four-stages.

The byte load instruction completes its processing through five stages of the IF stage 401, D-stage 402, E stage 403, M stage 404 and W stage 405. On the other hand, the word/2-word/4-word load or store instruction completes its processing through the four stages of the IF stage 401, D-stage 402, E stage 403 and M stage 404.

As for the non-alignment access, the operand access unit 104 divides it into two accesses under the control of the M stage 404 to make the memory access. The E stage 403 completes the processing in one clock cycle.

As for the instructions that take two cycles for the execution, the first and second instruction decoders 122 and 123 process them in two cycles, outputs the execution control signal in each cycle, and completes the operation in two cycles.

As for the long instructions, each 32-bit instruction constitutes one long instruction, the processing of which will complete the execution of the 32-bit instruction. The processing speed of the two instructions that are executed in parallel are governed by the processing speed of the short instruction with a greater number of processing cycles. For example, a combination of a two-cycle instruction and a one-cycle instruction takes two cycles. As for the two short instructions that are executed sequentially, their sub-instructions are combined such that the instructions are decoded sequentially in the decoding stage to be executed. For example, to carry out two add instructions, which complete their execution in one-cycle at the E stage 403 each, it takes two cycles, one cycle for each instruction in the D-stage 402 and the other one cycle for each instruction in the E stage 403. In parallel with the execution of the firstly executed instruction in the E stage 403, the decoding of the secondly executed instruction is carried out in the D-stage 402.

Next, the bit assignment of the instruction, and decode processing will be described in detail.

Generally speaking, the code size required to carry out the same processing can be reduced by assigning the maximum possible number of instructions to instruction codes with the shortest possible bit length. In addition, as the number of instructions assigned to the short instruction codes increases, the performance will be improved because of the parallel execution. However, it is not easy to assign a lot of instructions to short code. In particular, as for the data processor with general-purpose registers, since the operand specification requires a considerable instruction bit length, the types of the assignable instructions are limited. For example, consider a two-operand instruction that specifies two of the 16 general-purpose registers as its operands in the present embodiment, in which the short instructions each consist of 15 bits. In this case, since the operand specification requires eight bits, only 128 instructions can be assigned in terms of the two-operand instructions. Besides, although the present embodiment sets the bit length of the instructions at 32 bits, when they cannot be assigned well to 32 bits considering the general purpose applications, it is preferable that the bit length of the instruction be set at 64 bits in view of a problem of alignment and the like, in which case the code size increases sharply.

In view of this, the data processor makes the following bit assignment.

The first operation unit 116 is asymmetric with the second operation unit 117, though they can both execute data transfer between registers or between a register and a short immediate value, comparison, and arithmetic logic instructions. The first decoder 122 decodes the instructions executed by the first operation unit 116, and the second decoder 123 decodes the instructions executed by the second operation unit 117. Thus, the first decoder 122 is also asymmetric with the second decoder 123.

To reduce the delay time between the instruction fetch and the start of decoding, the decoding is started immediately without making a pre-decision before starting the decoding of the instruction, as to which instruction codes in the containers are input to which decoders. The first decoder 122 always decodes the instruction code in the left-hand container 52, whereas the second decoder 123 always decodes the code in the right-hand container 53. As illustrated in FIG. 9, the FM bits 51 and the bit 0 and bit 1 in the left-hand container (that is, bit 2 and bit 3 of the 32-bit instruction) are supplied to both the decoders 122 and 123. As for the secondly executed instruction of the sequentially executed two instructions, the predecoder 124 makes a decision as to which decoder decodes the instruction during the decoding of the firstly executed instruction, and the decision result is transferred to the D-stage control unit 126. After decoding the firstly executed instruction, the selected decoder decodes the secondly executed instruction under the control of the D-stage control unit 126. For the simplicity sake, the firstly executed instruction of the sequentially executed two instructions is called S1 instruction, and the secondly executed instruction is called S2 instruction. In addition, the instructions executed in parallel are called P instructions.

The short instructions of the data processor can be grouped under the following headings.

Category A: Instructions executable by both the first operation unit 116 and second operation unit 117.

Category B: Instructions executable by only the first operation unit 116.

Category B1: Executable as P, S1 or S2 instruction.

Category B2: Executable as P or S1 instruction, but unexecutable as S2 instruction.

Category C: Instructions executable by only the second operation unit 117.

Category C1: Executable as P, S1 or S2 instruction.

Category C2: Executable as P or S1 instruction, but unexecutable as S2 instruction.

Usually, even in the digital signal processing, the sequence control occupies a very large proportion of the program. Besides, the number of instructions often used for the signal processing is rather limited. Such basic instructions as arithmetic operation, transfer, comparison, load/store, and branch instruction, which have a high frequency of occurrence, and a high priority in terms of the code size and performance, are assigned to the category A, B1 and C1.

As for the instructions that are used for only particular processing (applications) or that execute comparatively special operations, although their dynamic execution frequency is comparatively high, many of them have a comparatively low static frequency of occurrence. Although it is preferable for such instructions to be assigned to the short instructions to enable the parallel execution with other instructions to improve the performance, they have rather little effect on the total code size (cost) even if their code size is lengthened to some extent. Such instructions are assigned to the category B2 or C2.

As for the P instructions and S1 instructions, the position of the container determines the execution unit to be used. Accordingly, assigning different operations to the same operation code presents no problem. Thus, as for the categories B1 and C2 and the categories C1 and B2, it is possible for the category B and C instructions with different operations to be assigned to the same operation codes. Considering the characteristics of the instructions in this way enables a greater number of instructions to be assigned to the short instruction codes efficiently. As for the instructions in the categories B2 and C2, they cannot be encoded as the S2 instruction. Thus, when they are executed after the S1 instruction that cannot be executed in parallel, the NOP (No Operation) instruction that is executed in parallel with the S1 instruction is inserted. As for the category A, the same operations are assigned to the same operation codes regardless of the arithmetic sections that execute them.

Next, the processing on the hardware will be described in detail. First, the bit assignment of an instruction taken as an example will be described.

FIG. 13 illustrates the instruction bit assignment of the LD instruction in the register indirect mode with post-increment and the MAC2 instruction. The two instructions have their operation code fields 201 and 204 assigned the same operation code. The LD instruction belongs to the category B1, and the MAC2 instruction belongs to the category C2. The LD instruction reads from the memory the 16-bit data specified by the address stored in the register Rb specified by the Rb field 203, and writes it to the register Ra specified by the Ra field 202. The value of the Rb is incremented by two to be written back. The MAC2 instruction executes two multiply-add operations in parallel. It multiplies the values of the registers Ra and Rb, adds the multiplication result to the value of the accumulator A0, and writes the addition result back to the A0. Besides, it multiplies the values of the registers Ra+1 and Rb+1, where Ra+1 designates a register with the number of one plus the register number specified by the Ra (similar representations will be used from now on), and adds the multiplication result to the value of the accumulator A1, and writes the addition result back to the accumulator A1.

FIG. 14 illustrates the instruction bit assignment of the LDB2 instruction in the register indirect mode with post-increment, and that of the MAC instruction. The two instructions have their operation code fields 205 and 207 assigned the same operation codes. In the MAC instruction, however, the field 208 serves as the accumulator specification field of a destination. When the accumulator A0 is specified, the two instructions have the same operation code including the field 206. The LDB2 instruction belongs to the category B2, and the MAC instruction belongs to the category C1. The LDB2 instruction reads from the memory the 16-bit data specified by the address stored in the register Rb, carries out the sign extension of the individual byte data to 16-bit data, and writes them back into the registers Ra and Ra+1. The value of the register Rb is incremented by two, and is written back. The MAC instruction is a multiply-add operation instruction. It multiplies the values in the registers Ra and Rb, adds the multiplication result to the value in the accumulator Ad specified by the Ad field 208, and writes the addition result back to the accumulator Ad.

FIG. 15 illustrates the instruction bit assignment of the ADD instruction that belongs to the category A. It adds the values in the registers Ra and Rb, and writes the result back to the register Ra. FIG. 16 illustrates the bit assignment of the NOP instruction that also belongs to the category A.

FIG. 17 shows an example of a program that executes a LD instruction and an ADD instruction in parallel. The symbols Ia and Ib each suppose a long instruction to be executed by the first operation unit 116. In the program, "||" designates that the two instructions are executed in parallel (this symbol is used to represent that function from now on). FIG. 18 illustrates the encoded state of the LD instruction and ADD instruction of FIG. 17 as a 32-bit instruction. The left-hand container stores the LD instruction and the right-hand container stores the ADD instruction, in which the FM bits are "00" indicating that the two instruction are carried out in parallel. FIG. 19 illustrates the pipeline processing of the program of FIG. 17. For the sake of simplicity, only portions from Ia to Ib are illustrated. In the period T3, the first decoder 122 decodes the LD instruction, and the second decoder 123 decodes the ADD instruction. In the period T4, the first operation unit 116 executes the address calculation of the LD instruction and the update of the pointer, and the second operation unit 117 executes the ADD instruction.

FIG. 20 shows an example of a program that executes the ADD instruction after executing the LD instruction. FIG. 21 illustrates the encoded state of the LD instruction and ADD instruction of FIG. 20 as a 32-bit instruction. The left-hand container stores the LD instruction, and the right-hand container stores the ADD instruction, in which the FM bits are "01" indicating that the ADD instruction is executed after executing the LD instruction. FIG. 22 illustrates the pipeline processing of the program of FIG. 20. In the period T3, the first decoder 122 decodes the LD instruction belonging to the S1 instruction. In the same period T3, the predecoder 124 predecodes the ADD instruction belonging to the S2 instruction. The data processor of the present embodiment makes a decision by means of hardware that the instructions belonging to the category A, which are executable by both the execution units, are executed by the first operation unit 116. Thus, a decision is made that the ADD instruction is to be decoded by the first decoder 122, and the decision result is supplied to the D-stage control unit 126. In the period T4, the first decoder 122 decodes the ADD instruction according to the decision result by the predecoder 124, under the control of the D-stage control unit 126. In the period T4, the LD instruction is executed in the E stage 403. In the example of the program, because the conflict can takes place of the load operand with regard to the R0, the issue of the ADD instruction to the E stage 403 is prevented until the end of the load of the R0. In the period T5, the processing of the ADD instruction is provided to the E stage 403, and in the period T6, the first operation unit 116 executes the ADD instruction.

Figure 26:
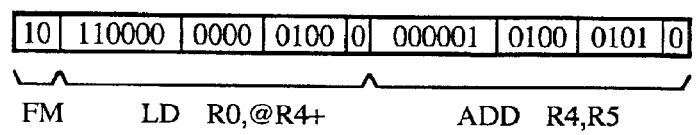
FIG. 26 is a schematic diagram showing a state in which the left-hand container stores the LD instruction and the right-hand container stores the ADD instruction.
Figure 27:
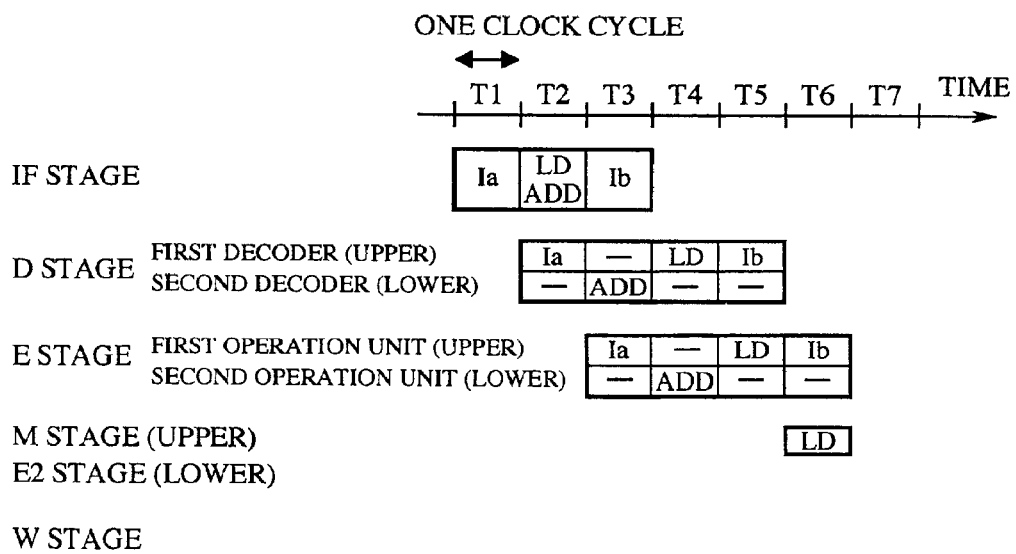
FIG. 27 is a schematic diagram showing a pipeline processing when the encoding is executed as shown in FIG. 26.

FIG. 23 illustrates an example of a program that executes a LD instruction after executing an ADD instruction. FIGS. 24 and 26 each illustrate an encoded state of the LD instruction and ADD instruction of FIG. 23 as a 32-bit instruction. Since the ADD instruction belongs to the category A, and can be stored in either the right-hand or left-hand container when encoded as the S1 instruction, it has two encoding schemes. Although the program processing does not vary depending on the encoding methods, the execution unit that executes the ADD instruction changes. In FIG. 24, the left-hand container stores the ADD instruction, and the right-hand container stores the LD instruction, in which the FM bits are "01", indicating that the LD instruction is executed after completing the ADD instruction. FIG. 25 illustrates the behavior of the pipeline processing when the program of FIG. 23 is encoded as illustrated in FIG. 24. In the period T3, the first decoder 122 decodes the ADD instruction belonging to the S1 instruction. In the same period T3, the predecoder 124 predecodes the LD instruction belonging to the S2 instruction. A decision is made that the LD instruction is to be decoded by the first decoder 122. The decision result is supplied to the D-stage control unit 126. In the period T4, the first decoder 122 decodes the LD instruction under the control of the D-stage control unit 126, and the first operation unit 116 executes the ADD instruction. In the case of FIG. 26, the left-hand container stores the LD instruction, and the right-hand container stores the ADD instruction, in which the FM bits of "10" indicate that the LD instruction is executed after the execution of the ADD instruction. FIG. 27 illustrates the behavior of the pipeline processing when the program of FIG. 23 is encoded as shown in FIG. 26. In the period T3, the second decoder 123 decodes the ADD instruction belonging to the S1 instructions, and the predecoder 124 predecodes the LD instruction belonging to the S2 instructions. A decision is made that the LD instruction is to be decoded by the first decoder 122. The decision result is supplied to the D-stage control unit 126. In the period T4, the first decoder 122 decodes the LD instruction under the control of the D-stage control unit 126, and the second operation unit 117 executes the ADD instruction.

FIG. 28 shows an example of a program that executes an ADD instruction and a MAC2 instruction in parallel. FIG. 29 illustrates an encoded state of the ADD instruction and MAC2 instruction of FIG. 28 as a 32-bit instruction. The left-hand container stores the ADD instruction, and the right-hand container stores the MAC2 instruction, in which the FM bits of "00" indicate that the two instructions are executed in parallel. FIG. 30 illustrates the behavior of the pipeline processing of the program of FIG. 28. In the period T3, the first decoder 122 decodes the ADD instruction, and the second decoder 123 analyzes the MAC2 instruction. In the next period T4, the first operation unit executes the ADD instruction, and the second operation unit carries out the two multiplications of the MAC2 instruction. In the period T5, the two additions of the MAC2 instruction are executed.

FIG. 31 shows an example of a program that executes the ADD instruction after completing the MAC2 instruction. Although this example can be executed in parallel without the operand conflict, the sequential execution will be described for explaining the decoding. FIG. 32 illustrates the encoded state of the ADD instruction and MAC2 instruction of FIG. 31 as a 32-bit instruction. The left-hand container stores the ADD instruction, and the right-hand container stores the MAC2 instruction, in which the FM bits are "10", indicating that the ADD instruction is executed after completing the MAC2 instruction. FIG. 33 shows the behavior of the pipeline processing of the program of FIG. 31. In the period T3, the second decoder 123 decodes the MAC2 instruction belonging to the S1 instruction, and the predecoder 124 predecodes the ADD instruction belonging to the S2 instruction, in which a decision is made that the ADD instruction is to be decoded by the first decoder 122. The decision result is supplied to the D-stage control unit 126. In the period T4, the first decoder 122 decodes the ADD instruction according to the decision result by the predecoder 124 under the control of the decode D-stage control unit 126. In the same period T4, in the E stage, the second operation unit 117 carries out the multiplication of the MAC2 instruction, and in the next period T5, the first operation unit 116 executes the ADD instruction.

FIG. 34 shows an example of a program that executes the MAC2 instruction after executing the ADD instruction. FIG. 35 illustrates the encoded state of the ADD instruction and MAC2 instruction of FIG. 34 as 32-bit instructions. The MAC2 instruction belongs to the category C2 that cannot be executed as the S2 instruction. Thus, it cannot be stored as a single 32-bit instruction. Although the MAC2 instruction can be encoded as the S1 instruction, the example of the program has no short instruction to pair with the MAC2 instruction. Thus, the instructions are encoded to be executed in parallel with the NOP instruction. In the example of FIG. 35, the ADD instruction is stored in the left-hand container to be executed in parallel with the NOP instruction stored in the right-hand container, and the MAC2 instruction is stored in the right-hand container to be executed in parallel with the NOP instruction stored in the left-hand container. Thus, the two instructions are encoded to two 32-bit instructions. FIG. 36 illustrates the behavior of the pipeline processing when the program of FIG. 34 is encoded as illustrated in FIG. 35. The ADD instruction and the NOP instruction, and the NOP instruction and the MAC2 instruction are processed in parallel, respectively.

As described above, the present embodiment 1 assigns different instructions that are executed by the first operation unit 116 and the second operation unit 117, and that belong to the category B1 and category C2, or to the category C1 and category B2, to the same operation codes. This offers an advantage of being able to increase the number of short instructions executable in parallel with a limited instruction bit length, thereby improving the performance. In addition, although the category B2 or category C2 instructions cannot be assigned to the S2 instructions, both the instructions are executable as the S1 instruction, and even when they cannot be executed in parallel, the present embodiment 1 has an advantage of being able to reduce their code size. Furthermore, different instructions can be assigned to the same operation codes without a field for expressly specifying the execution unit that executes the instruction, which offer an advantage of being able to reduce the code size. The reduction in the code size makes it possible to reduce the size of a program ROM in a built-in application, thereby reducing the cost of the data processor. Furthermore, the reduction in the size of the program ROM can reduce the capacity and number of the ROMs, thereby reducing the wiring length for connecting with the memories. Thus, the wiring capacity for connecting the memories can be reduced, offering an advantage of being able to reduce the power consumption. Moreover, when the memory access governs the operation rate of the entire system, the present embodiment 1 offers an advantage of being able to improve the operation frequency.

In this way, the present embodiment can assign a greater number of instructions to the operation codes with short instruction bit length. As a result, it offers an advantage of being able to provide an efficient, high performance and low cost data processor.

The configuration of the data processor of the present embodiment is only an example, and hence does not restrict the scope of the present invention.

For example, for the sake of simplicity, although the instructions executable by both the first operation unit 116 and the second operation unit 117 are assigned the same instruction codes, they can be assigned different operation codes so that the decoders can decode them more easily. When an instruction that belongs to the category A is the S2 instruction, although a decision is made by means of hardware that the first operation unit 116 executes it, the second operation unit 117 can perform it instead.

The instruction registers can be placed anywhere physically. For example, it is possible to provide latches at the front of the decoders to hold the values after selecting the right-hand and left-hand containers. Thus, only the instruction requiring new decoding is input to the decoder to prevent the decoder from operating in unnecessary cycles, thereby reducing the power consumption. It is necessary, however, to control not to issue a valid instruction.

Although the foregoing embodiment handles the case where two instructions are executed in parallel for simplicity sake, it is also applicable to the case where three or more instructions are executed in parallel. When N instructions are decoded in parallel, N different operations can be assigned to a single operation code at the maximum. As for the instructions that are executed in the second cycle and onward in the instructions sequentially executed, it is possible to specify only one of the operations. When N instructions are decoded in parallel, N−1 predecoders are needed to execute only the firstly executed instruction prior to the execution of the remaining instructions. When N instructions are decoded in parallel, N instructions can be divided into M groups, to each group of which the technique in accordance with the present invention is applicable, where M is less than N. In each group, different operations are assigned to the same operation code. As for the instructions executed in the second cycle and onward, it is possible to execute only the operations defined in each group.

Furthermore, the present embodiment is applicable to a case where a plurality of VLIW instructions are controlled by using the VLIW or superscaler.

Although the foregoing embodiment describes for simplicity's sake the example where two instructions are executed in parallel, and the instruction decoding units 122 and 123 and the main operation units 116 and 117 are assigned to the two instructions, respectively, they can be assigned to a plurality of decoders and execution units logically. For example, the first operation unit 116 can take a configuration consisting of three separate blocks: an operation unit for executing branch/jump associated processing; an operation unit for executing memory access associated processing; and an operation unit for executing integer operation, transfer and the like. Besides, the instruction decoding unit can be logically divided into blocks for decoding the instructions group by group. For example, the first decoder 122 can be divided into a decoder for decoding the branch/jump associated instructions, a decoder for decoding the memory access associated instructions, and a decoder for decoding the instructions executing the integer operation, transfer and the like. Thus, the present technique is applicable by considering each decoder group as a single decoder.

The pipeline configuration also does not impose any limit to the application of the present technique.

Embodiment 2

Figure 37:
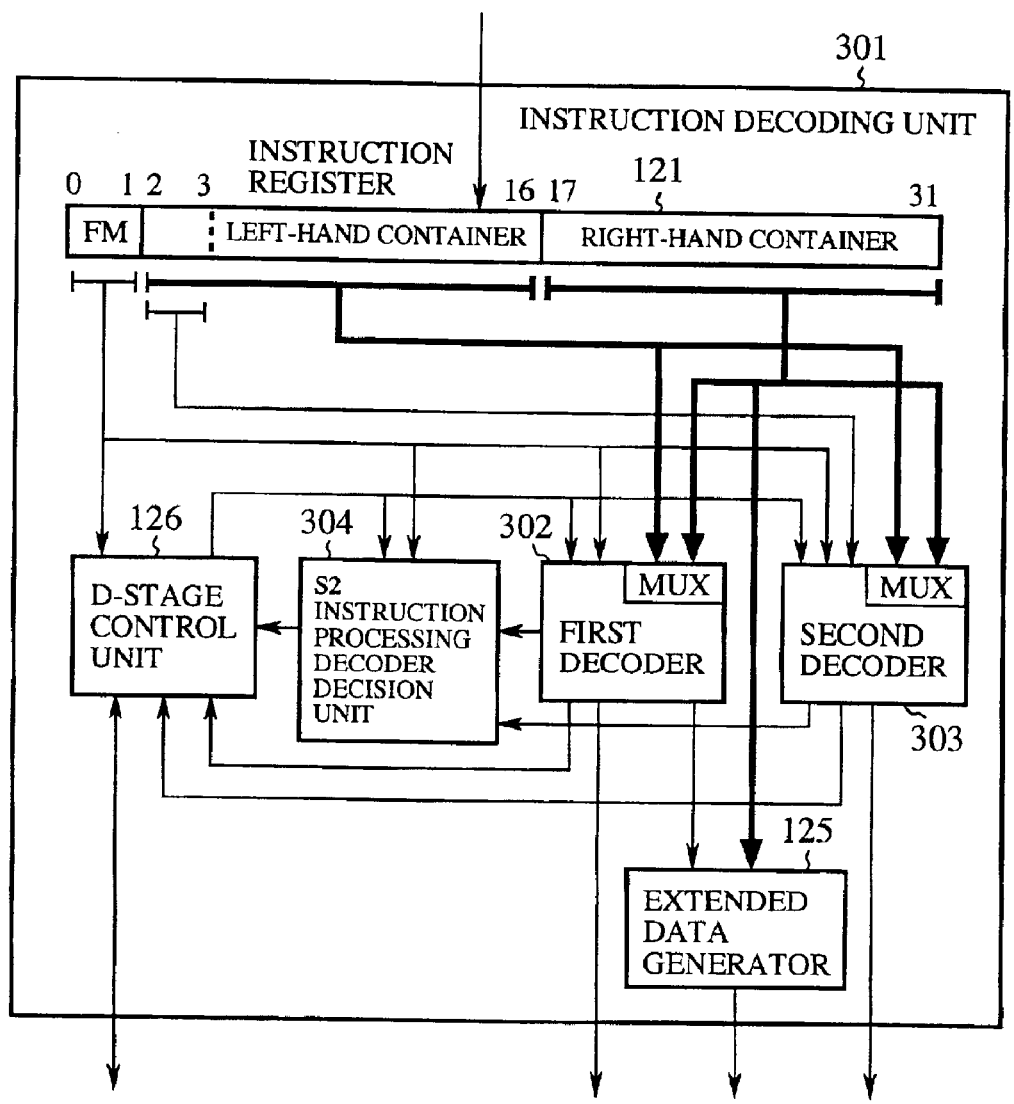
FIG. 37 is a block diagram showing a configuration of an instruction decoding unit of an embodiment 2 of the data processor in accordance with the present invention.

Next, the embodiment 2 will be described which implements a decision means for deciding the decoder for decoding the S2 instructions in another configuration. For the sake of simplicity, it is assumed that the same instruction set is processed by nearly the same configuration as the embodiment 1. FIG. 37 is a block diagram showing a configuration of an instruction decoding unit 301 of the embodiment 2 of the data processor. It corresponds to the instruction decoding unit 113 of the embodiment 1. The remaining portion is identical to that of the embodiment 1. The portions different from those of the embodiment 1 will be mainly described here.

A first decoder 302 and a second decoder 303 of the data processor correspond to the first decoder 122 and the second decoder 123 of the embodiment 1, respectively. In the first cycle of a 32-bit instruction, the first decoder 302 decodes the instruction stored in the left-hand container, and the second decoder 303 decodes the instruction stored in the right-hand container. When two instructions executed in sequence are processed, the first decoder 302 and the second decoder 303 decode the S2 instruction captured during the decoding of the S1 instruction. When it is found that the instructions in the decoders are the S2 instruction, the information is generated as to which decoder processes the S2 instruction, and is supplied to the S2 instruction processing decoder decision unit 304. According to the information and the FM bit values, the S2 instruction processing decoder decision unit 304 supplies the D-stage control unit 126 with information as to which decoder will process the S2 instruction. Thus, the present embodiment 2 differs from the embodiment 1 in that when the decoders 302 and 303 handle the S2 instruction, the S2 instruction processing decoder information is generated. The embodiment 2 does not have a component corresponding to the predecoder 124 of the embodiment 1. After the S1 instruction is decoded, the selected decoder decodes the S2 instruction under the control of the D-stage control unit 126. Other than the processing by the instruction decoding unit 301, the present embodiment 2 is identical to the embodiment 1.

As described above, the present embodiment 2 is configured such that when the decoders handle the S2 instruction, they have a function to make a decision as to which decoder processes the instruction. With such a configuration, the present embodiment can carry out the same processing just as the embodiment 1.

Although the S2 instruction processing decoder decision unit 304 is separated in the present embodiment 2 to make clear the correspondence between the present embodiment 2 and the foregoing embodiment 1, it can be integrated into the D-stage control unit 126 or the like because its logic is very simple.

Making a decision as to the processing decoder of the S2 instruction in such a manner as described in the present embodiment 2 can offer the same advantages as the embodiment 1. Thus, it can assign a greater number of instructions to the operation codes with a short instruction bit length, thereby offering an advantage of being able to implement a high code efficiency, high performance and low cost data processor.

Although the present embodiment 2 is described taking an example of executing two instructions in parallel for the sake of simplicity, when the method of the foregoing embodiment 1 is applied to a case where an increasing number of instructions are decoded and executed in parallel, it is unavoidable that the number of the predecoders increases. For example, when N instruction are decoded in parallel, N–1 predecoders are required at the maximum with complicating the assigning control of the instruction codes to the predecoders. Accordingly, when there are a lot of instructions to be decoded in parallel, it is advantageous for the individual decoders to have a function to decide the processing decoders, which offers an advantage of being able to reduce the additional hardware for carrying out the predecoding, and to make the configuration simpler.

The technique described in connection with the present embodiment 2 is applicable to the various configurations as described in the foregoing embodiment 1, presenting similar advantages.

What is claimed is:

1. A data processor for processing an instruction that includes a first operation code field, a second operation code field, and an execution sequence specifying field for specifying an execution sequence of a plurality of operations specified by a plurality of operation code fields including the first operation code field and the second operation code field, said data processor comprising:

instruction decoding means for decoding instructions; and instruction executing means for executing the instructions according to a decoded result by said instruction decoding means, wherein said instruction decoding means includes:

first decoding means for decoding the first operation code field when an operation specified by the first operation code field is executed in a first execution sequence in accordance with a content specified by the execution sequence specifying field;

second decoding means for decoding the second operation code field when an operation specified by the second operation code field is executed in the first execution sequence in accordance with the content specified by the execution sequence specifying field; and decision means for making a decision as to which one of decoding means including said first decoding means and said second decoding means is to be used for decoding the operation code field to be executed in a second or subsequent execution sequence in accordance with the content specified by the execution sequence specifying field, and wherein said instruction executing means comprises:

means for executing a first operation in response to the decoded result by said first decoding means when the first operation code field has a first bit pattern, and when the operation specified by the first operation code field is executed in the first execution sequence according to the execution sequence specifying field; and means for executing a second operation different from the first operation in response to the decoded result by said second decoding means when the second operation code field has the first bit pattern, and when the operation specified by the second operation code field is executed in the first execution sequence according to the execution sequence specifying field.

2. The data processor according to claim 1, wherein said instruction executing means further comprises:

means for executing the second operation in response to the decoded result by said second decoding means when the first operation code field has the first bit pattern, when the execution sequence specifying field specifies that the operation specified by the first operation code field is to be executed in the second or subsequent execution sequence, and when said decision means makes a decision that said second decoding means is used for decoding the first operation code field.

3. The data processor according to claim 2, wherein said decision means makes a decision in response to a decoded result by a decoder other than said first decoding means and said second decoding means.

4. The data processor according to claim 2, wherein said decision means makes a decision in response to decoded results by decoders including said first decoding means and said second decoding means.

* * * * *